June 2, 1964     H. K. EBERT     3,135,087

CONTROL SYSTEM FOR HYDROSTATIC TRANSMISSIONS

Filed Feb. 26, 1962     5 Sheets-Sheet 1

INVENTOR.
HEINRICH K. EBERT

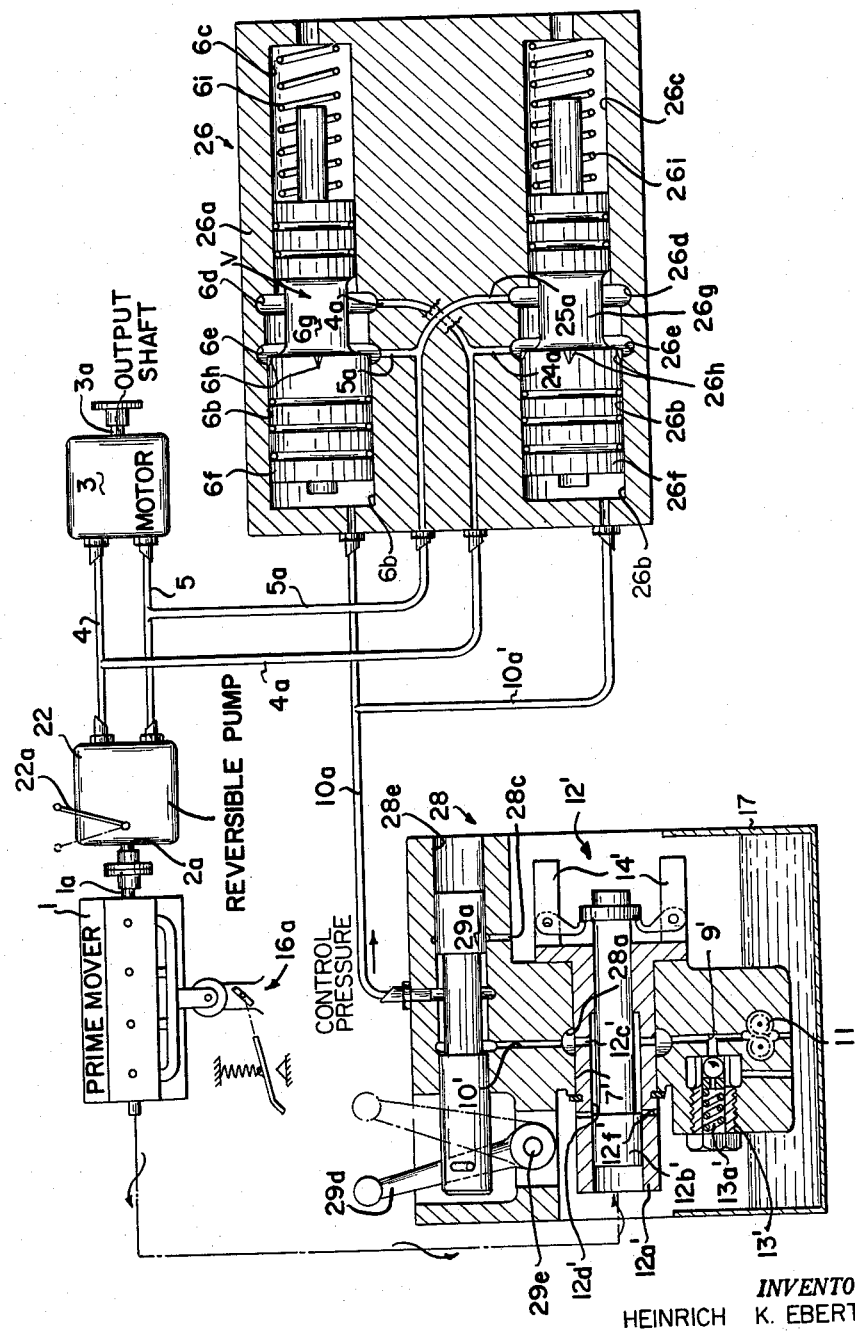

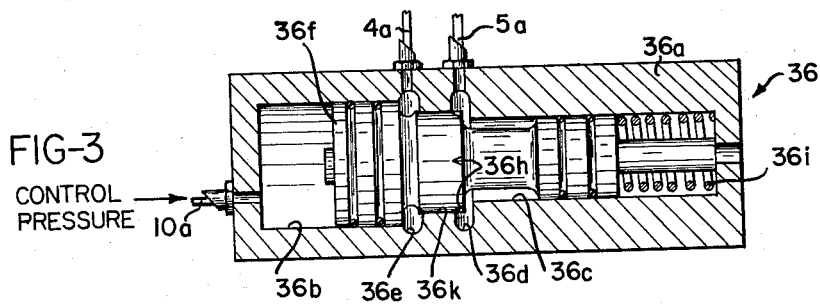
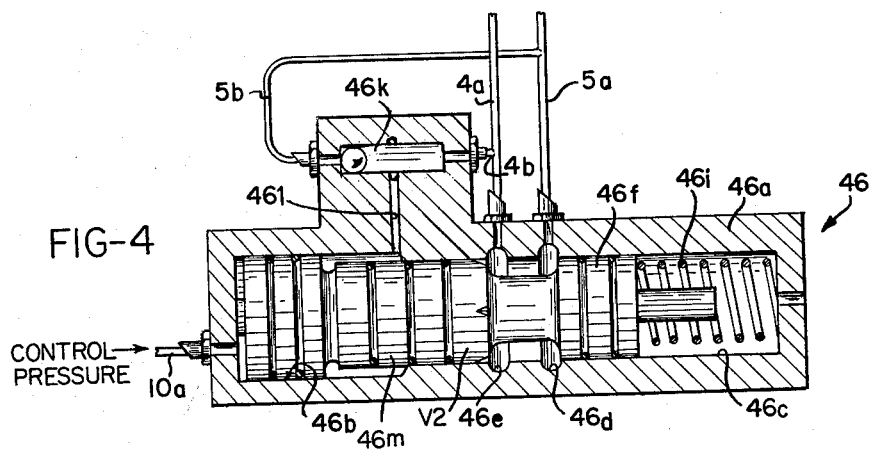
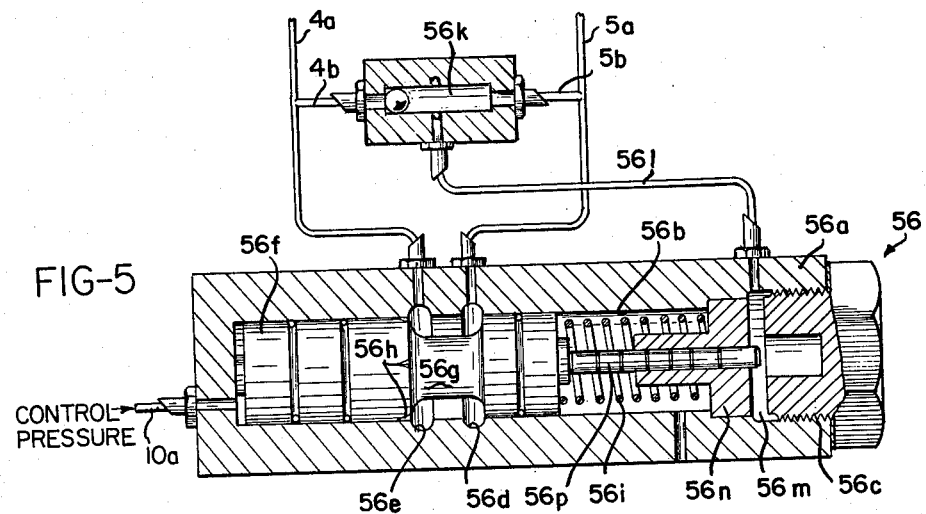

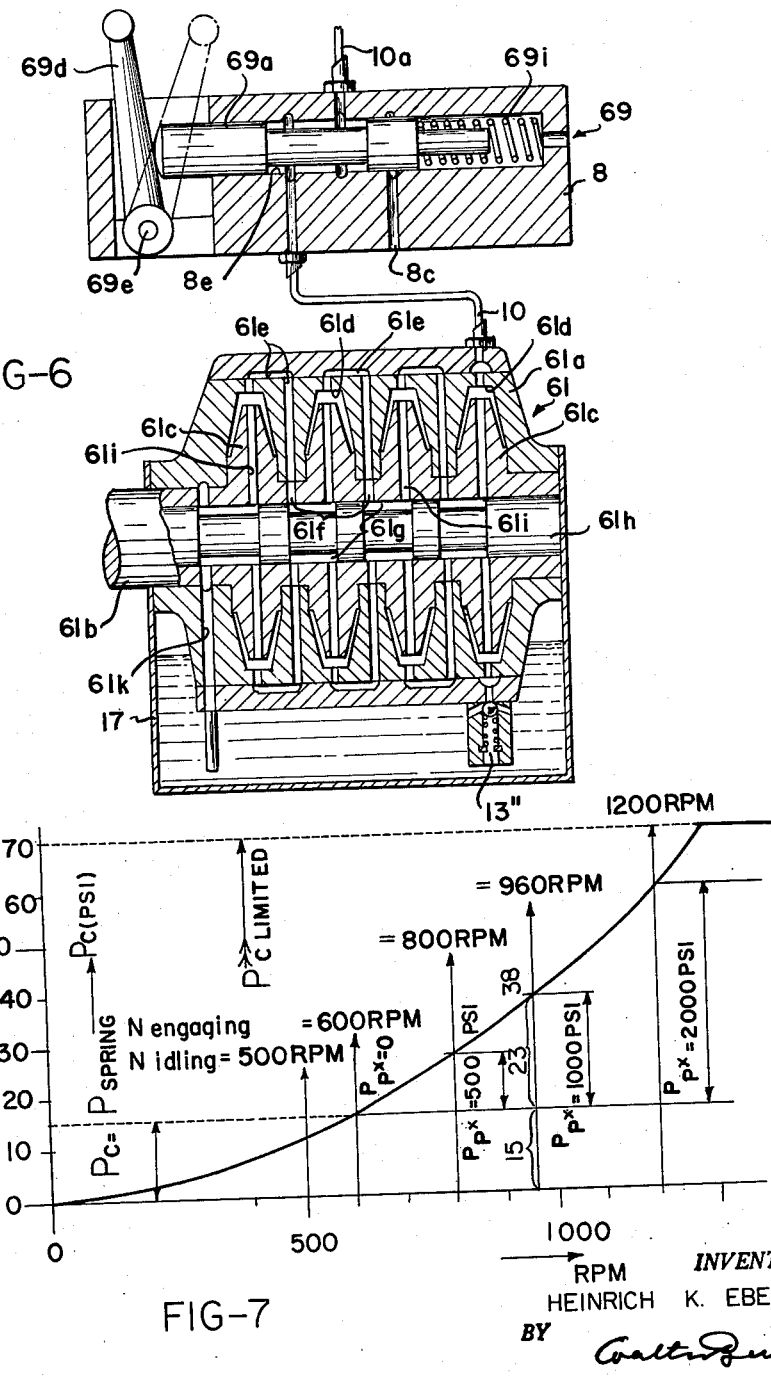

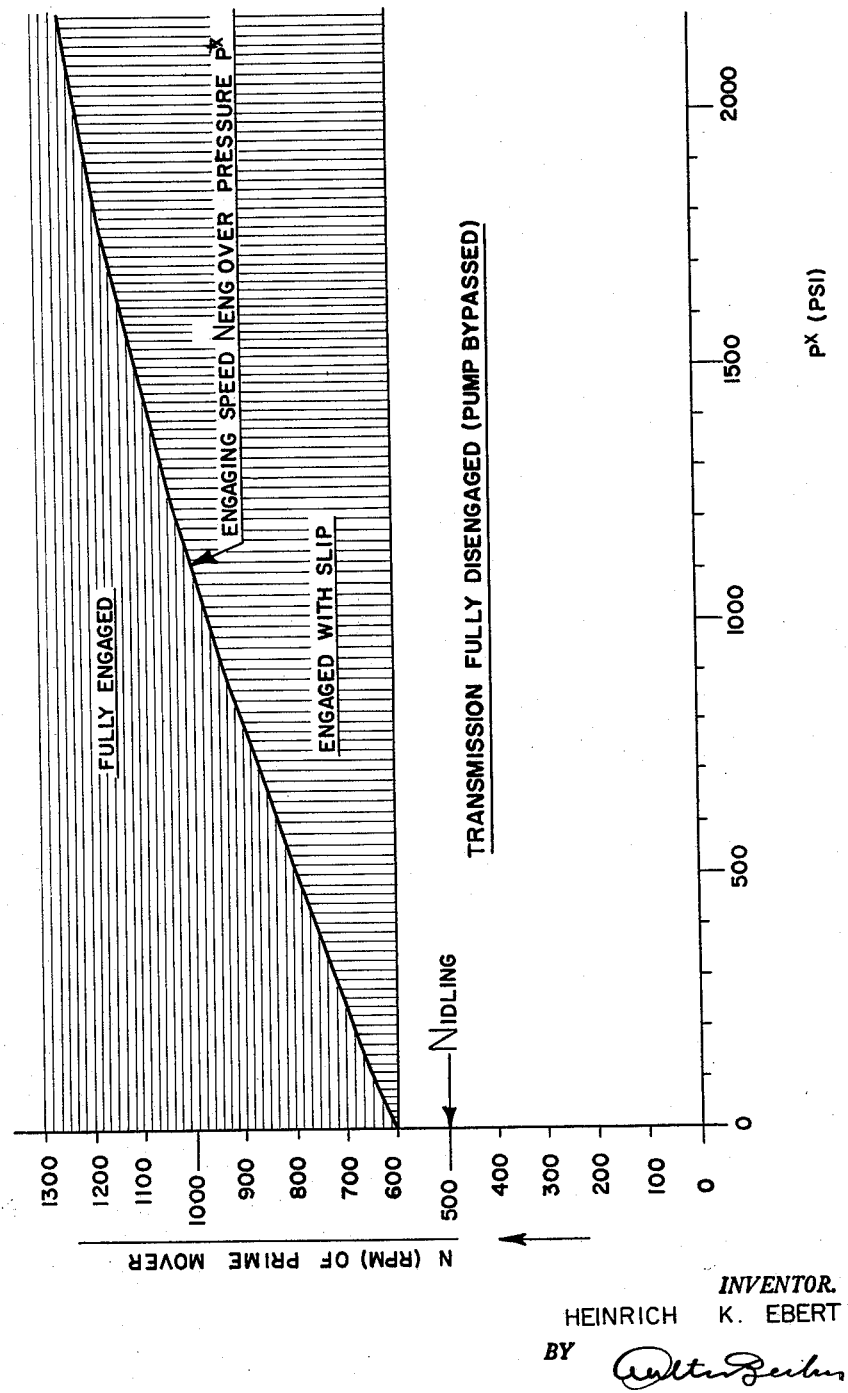

United States Patent Office 3,135,087
Patented June 2, 1964

3,135,087
CONTROL SYSTEM FOR HYDROSTATIC
TRANSMISSIONS
Heinrich K. Ebert, Im Weller 2, Furth, Bavaria, Germany
Filed Feb. 26, 1962, Ser. No. 175,542
Claims priority, application Germany Dec. 19, 1953
18 Claims. (Cl. 60—19)

The present invention relates to an automatic bypass valve for hydrostatic pumps in hydrostatic transmissions and is of particular importance in connection with hydrostatic transmissions in motor vehicles.

This application is a continuation-in-part application of my copending application Serial No. 11,327 filed February 26, 1960, now abandoned, which in turn is a continuation-in-part application of my application Serial No. 475,737 filed December 16, 1954 and now abandoned.

Hydrostatic transmissions generally comprise a pump and a motor unit. The pump unit is driven by a prime mover and in its turn hydraulically conveys the input power to the hydraulic motor unit the output shaft of which, in the case of a vehicle, is drivingly connected to the wheels of the vehicle.

Although with such hydrostatic transmissions it would theoretically be possible for purposes of stopping the vehicle to adjust the delivery or the stroke of the pump to zero, but experience has shown that practically this is not possible in faster vehicles such as street vehicles, in connection with automatically adjusted and controlled hydrostatic transmissions. The reason therefor consists in that, as soon as with such an arrangement the step-down ratio due to the reduction of the pump stroke has reached values between 1:3 and 1:∞, the vehicle will each time be braked or accelerated to such an extent that a normal smooth driving is not possible. Similar remarks apply to the starting of the vehicle on a hill. Aside from the fact that the pump, which under these conditions is adjusted for the zero stroke, would be unable to absorb a torque, so that at the start of the operation the vehicle motor would race, for obtaining a smooth starting the automatic control of the transmission ratio would have to be so highly sensitive and would have to be responsive so fast, that it cannot be realized in practice, or other considerable difficulties would be encountered.

For the above reasons, it is not permissible during a stopping of a fast street vehicle to allow the adjustment of the ratio of a hydrostatic transmission below the lowest stepdown transmission ratio customary with ordinary shiftable transmissions. This means that the hydraulic pump of the hydrostatic transmission must never be adjusted below a certain delivery per revolution, i.e., never below a certain piston stroke. Consequently, it is necessary for purposes of stopping the vehicle, either between the prime mover which can never rotate below a certain idling speed, and the hydrostatic transmission to provide a disengageable clutch as is customary with ordinary gear shifting transmissions, or to provide between pump and motor a shut-off valve, for instance a bypass valve, for short-circuiting the fluid conduits between the hydraulic pump and the hydraulic motor. Therefore, it has already been suggested in connection with a hydrostatic transmission which is not adjustable to a ratio of 1:∞, to provide mechanically operable clutches or bypass valves in the above-described manner, which are either operable by hand or which operate automatically. However, even the heretofore known automatic coupling mechanisms or shut-off valves do not completely meet the requirements set forth above.

It is, therefore, an object of the present invention to provide coupling means, which will overcome the above-mentioned drawbacks.

It is another object of this invention to provide coupling means for a hydrostatic transmission, which will be so designed that, particularly in cooperation with an internal combustion engine as prime mover, it will yield a slip-free coupling already at a speed of approximately 18 to 20% of the maximum prime mover speed with the accelerator depressed only slightly, for instance when starting on a plane, and which will at a full gas supply, for instance when starting on a hill, yield a slip-free coupling only from and above a speed of approximately 40% of the maximum prime mover speed.

It is another object of this invention to provide coupling means of the type set forth above, in which, for reasons of safety, the coupling effect will remain limited to a certain maximum torque, which, with a hydrostatic transmission, means to a maximum liquid pressure.

It is a further object of this invention to provide coupling means of the type involved, in which the coupling effect may be made ineffective at any desired time, for instance in order to warm up the engine.

It is also an object of this invention to provide coupling means as set forth above, which will be equally applicable to the forward and the rearward driving range.

A further object of this invention consists in the provision of coupling means of the above-identified character, which will have a relatively low weight and can be produced at relatively low costs.

These and other objects and advantages of the invention will appear more clearly from the following specification in connection with the accompanying drawings, in which:

FIGURE 1 represents, partly in section, a basic example of a bypass valve and its control system therefor according to the present invention.

FIGURE 2 illustrates, partly in section, a modified bypass valve arrangement according to the invention, especially for use in connection with a reversible hydrostatic transmission.

FIGURE 3 illustrates a single bypass valve adapted to replace the two bypass valves of FIGURE 2.

FIGURE 4 illustrates, partly in section, a bypass valve according to the invention somewhat modified over that of FIGURE 3.

FIGURE 5 represents a further modification of the bypass valve according to FIG. 3.

FIGURE 6 represents a modification of the pressure control means for the bypass valves according to FIGURES 1 to 5.

FIGURE 7 indicates in form of a diagram the control pressures corresponding to the prime mover speed, which pressures bring about the actuation of the bypass valve according to the invention, said control pressures being plotted over the ordinate, and the speed of the prime mover being plotted over the abscissa.

FIGURE 8 diagrammatically illustrates a typical coupling characteristic of a bypass valve arrangement according to the invention. Expressed differently, the curve shown in FIGURE 8 represents the borderline between engagement with slip and slip-free engagement with regard to the prime mover speed corresponding to the working pressure in the hydrostatic transmission, the slip-free coupled prime mover speed being plotted over the ordinate, and the pressure of the working fluid of the hydrostatic transmission being plotted over the abscissa.

General Arrangement

The above-mentioned objects have been realized by the provision of a bypass valve in conformity with the present invention. More specifically, in conformity with the present invention, a spool valve has been provided between the pressure and suction conduits interconnecting the pump and motor units of the hydrostatic transmission driven by a prime mover. The said spool valve is so arranged that in one position of the valve spool of said valve, the flow of the transmission fluid from the pressure conduit to the suction conduit is bypassed, whereas in another position of said valve spool, this fluid flow is interrupted. The position of said valve spool between said two positions is in conformity with the present invention controlled by the forces or balance of three forces acting upon said valve spool. One of these three forces is exerted by a spring which is so arranged that it biases said valve spool in the direction toward bypassing position. The second of said three forces is exerted by the pressure or working fluid in the pressure conduit of the transmission, which pressure acts upon a spool surface so located that the pressure acting thereupon tends to move the valve spool in the direction toward bypassing position. Finally, the third of said three forces acts in a direction opposite to that of the other two forces and is exerted by a fluid pressure which henceforth will be termed "control pressure." This control pressure acts upon a surface of the valve spool which is effective in a direction opposite to the action of said spring, said control pressure being variable corresponding to the speed of the prime mover.

The effective spool surface acted upon by the pressure of the pressure or working fluid is so designed that the ratio of its area to the surface area acted upon by said control pressure amounts to from 1:50 to 1:150 depending on the particular prevailing circumstances, so that a control pressure of, for instance 1 p.s.i. will be able to balance a working fluid pressure of from 50 to 150 p.s.i. depending on the specific design.

If the spring force and the force exerted by the fluid pressure of the working fluid considerably exceeds the force exerted by the control pressure, the working fluid will be able in a free and unimpeded manner to pass from the pressure line to the suction line. The valve spool will be held in its bypassing position by the said spring.

*Structural Arrangement*

Referring now to the drawings in detail and FIG. 1 thereof in particular, the arrangement shown in FIG. 1 comprises a prime mover 1 drivingly connected to a hydrostatic pump 2 by means of shafts 1a and 2a. The arrangement furthermore comprises a hydrostatic motor 3 communicating with pump 2 through a pressure conduit 4 and a return conduit 5. The output shaft 3a of the hydrostatic motor is adapted drivingly to be connected to the wheels of a vehicle (not shown).

The hydrostatic pump as well as the hydrostatic motor may be of any convenient type. The fluid delivery of the pump and the fluid absorption of the motor may or may not be varied. However, the fluid delivery of pump 2 must under starting conditions never be zero and should have a constant value per revolution of the pump shaft 2a.

The arrangement of FIG. 1 includes a spool valve 6 comprising a valve housing 6a having bores 6b and 6c of different diameter and furthermore comprising two annular grooves 6d and 6e in bore 6b. The annular groove 6d communicates with the pressure conduit 4 by means of a conduit 4a, whereas the annular groove 6e communicates with the return conduit 5 through a conduit 5a.

Reciprocably mounted in said bores 6b and 6c is a valve spool generally designated V which is designed as a stepped piston having piston portions 6f and 6k of different diameters respectively fitting in bores 6b and 6c of the valve housing 6. The said valve spool V has a further reduced diameter portion 6g between the first-mentioned two piston portions of different diameters so that actually a groove will be formed between the piston portions 6f and 6k. Valve spool V is also provided with four notches 6h (three only being shown) where the reduced diameter valve spool portion 6g merges with the larger diameter piston portion 6f of the valve spool. The arrangement is such that in the right-hand end position of valve spool V, the pump fluid is bypassed from conduit 4 through conduit 4a, annular groove 6d, bore 6b, annular groove 6e and conduit 5a to the return conduit 5, whereas in the left-hand end position of valve spool V this flow is interrupted by the larger diameter portion 6f of the valve spool. Between the said two end positions there is, of course, possible any position in which the flow between conduit 4 and conduit 5 is more or less throttled, depending on the relationship of equilibrium between the different forces acting upon the valve spool. These forces are exerted in a by-passing sense by the thrust of a spring 6i which is mounted in bore 6c of the valve housing 6, and also by the pressure of the pumped fluid in conduits 4 and 4a, or inside of the annular groove 6d against the differential area of the valve spool, said differential area resulting from the difference between the greater and smaller effective piston area respectively pertaining to the piston portions 6f and 6k of said valve spool V. These forces are counteracted in a bypass interrupting sense by the force exerted by the fluid pressure acting upon the right end surface (with regard to FIG. 1) of the valve spool, which fluid pressure is henceforth called the "control pressure," said right end surface Ve representing the larger piston end surface of the valve spool.

As mentioned above, the ratio of said differential area to this end surface Ve normally amounts to from 1:50 to 1:150 so that, for example, a control pressure of 1 p.s.i. may balance a pressure of the pumped fluid in the conduit 4 which may be between 50 p.s.i. and 150 p.s.i. according to the respective design. When this control pressure increases more and more, the valve spool will move more and more toward the left, thereby to an ever-increasing extent throttling the by-passing flow between the conduit 4 and the conduit 5 while simultaneously building up a correspondingly higher and higher pressure in the pressure conduit 4. The said control pressure is, according to FIG. 1, produced by an auxiliary pump 11 in cooperation with the centrifugal pressure governor 12 and the relief valve 13.

The centrifugal pressure governor 12 consists primarily of a valve body 12a and a valve spool with a stepped piston 12b. The valve body is rotatable in bore 7 of the control governor housing 8 and, similar to the auxiliary pump is driven in any convenient manner by the prime mover so that its speed will be proportional to the prime mover speed.

The left-hand end of the valve body 12a is provided with bores extending transverse to the axis of rotation of said valve body. In these transverse bores there is displaceably mounted a stepped piston 12b having its greater diameter arranged remote from the centrifugal weight 14. The arrangement is such that the stepped piston 12b, when occupying the position shown in the drawing, permits the oil delivered by the pump 11 to flow through conduit 9, annular groove 8a, bore 12c in said valve body, and annular groove 12d into the annular groove 12e and from there through bore 12f, through annular groove 8b, and conduit 16 into the reservoir 17 from where the auxiliary pump draws its fluid. However, the said oil flow will be interrupted as soon as the stepped piston 12b, by means of its larger diameter portion, closes the bore of the same diameter located between annular groove 12d and 12e. The valve spool has that end thereof which is remote from the flyweight 14 provided with a collar 12m serving as abutment for limiting the displacement of the valve spool in the direction of the weight 14 which latter is fixedly connected to the valve spool and simultaneously is adapted to limit the displacement stroke of the valve spool in opposite direction. Between centrifugal weight 14 and valve body 12a there is provided a pressure spring 15 which urges the stepped piston 12b similar to the centrifugal force acting upon the flyweight 14 during rotation of the valve spool, into throttling or closing position. As a result thereof, the oil delivered by pump 11 must be pressed through the respective bores of the valve body of the centrifugal pressure governor at a pressure which is proportional to the total force resulting from the thrust of spring 15 and the centrifugal force of the flyweight plus the centrifugal force acting upon valve spool 12b and is inversely proportional to the differential area of the stepped piston.

Inasmuch as the thrust of spring 15 generally is merely so small as to be able to keep the piston 12b in closing position when spool 12 is not rotating, and inasmuch as the centrifugal force of the stepped piston with its flyweight increases with the square of the speed of the valve spool, it will be evident that the pressure exerted by the oil delivered by pump 11 in conduit 9 will vary with the second power of the speed. If this pressure at a correspondingly high prime mover speed exceeds the pressure at the relief valve 13 as determined by spring 13a, the said relief valve 13 will open, and the oil delivered by pump 11 will pass through the relief valve and conduit 18 into the reservoir 17, thus maintaining a constant pressure in conduit 9 which pressure is nearly independent of the speed. As a result thereof the stepped piston 12b will move into its closing position, and the centrifugal force pressure regulator will completely interrupt the passage of oil from conduit 9 into conduit 16. The valve spool 12b will have its collar in engagement with the valve body.

The pressure which is adapted to be governed by the pressure regulator 12 may thus be adjusted in conformity with the speed of the prime mover only between the pressure determined by spring 15 and the pressure determined by the relief valve 13. Inasmuch as through conduit 10, the two-way valve 19, and conduit 10a, the right-hand area Ve of the stepped piston V is acted upon by the pressure in conduits 9, 10, the position of the valve piston V becomes sensitive to both the transmission fluid pressure—therefore to the prime mover torque—and also to the speed of the prime mover, as will be described further below in connection with FIGS. 7 and 8. As a result thereof, it will be obvious that at fully opened gas throttle 16a, a hydraulic coupling between pump and motor 3 will be obtained only at a correspondingly higher speed of the prime mover, whereas, for instance, at only slightly opened gas throttle of the prime mover such coupling will already be effected at a correspondingly lower prime mover speed. As long as motor 3, particularly from a standstill, does not yet fully absorb the quantity of oil delivered by pump 2, the bypass valve will act in the manner of a slip clutch. In other words, it permits the quantity of oil delivered by pump 2 partly to flow from conduit 4 to conduit 5 but does not permit the prime mover to rotate at higher speed, thereby preventing a racing of the prime mover. Only after the motor 3 rotates so fast that it fully absorbs the quantity of oil delivered by pump 2, the said coupling will become slip-free so that with further increasing speed of motor 3, eventually also the pump speed and thereby the speed of the prime mover may increase.

The spool valve designed as two-way valve 19 comprises a valve spool 19a which is reciprocably mounted in a bore 8e of the governor housing 8 and by means of a spring 19b is continuously urged against the shift cam 19f fixedly connected to a shift lever 19d for turning about a pivot 19e. In the position illustrated in FIG. 1, conduit 10 connected to pump 11 communicates with conduit 10a leading to the bore 6b. If shift lever 19d is moved into its dot-dash line position, valve spool 19a will by means of spring 19b be moved toward the right. As a result thereof, conduit 10a will communicate with conduit 8c leading into a reservoir under atmospheric pressure (not shown) so that the pressure in line 10a is relieved, whereas conduit 10 will be closed.

It is obvious that when relieving the pressure in conduit 10a, the valve spool V will, due to spring 6i and the pressure in line 4a or groove 6d, be displaced into the illustrated fluid bypassing position so that when shifting over the shift lever 19d into the dot-dash line position, also at increased prime mover speed, a possible coupling of pump 2 to motor 3 may be interrupted or prevented.

Referring now to FIG. 2, this figure shows a modified bypass valve arrangement, especially for use in connection with a reversible transmission pump 22 of any type which may be actuated by control lever 22a into either forward or reverse position. Instead of the bypass valve 6 of FIG. 1, the arrangement of FIG. 2 comprises a bypass valve arrangement 26 in a valve housing 26a, in which in addition to the spool valve 6b to 6i of FIG. 1 there is provided a second spool valve of exactly the same type with corresponding parts designated 26b to 26i. These two valves are arranged in parallel to each other but with the difference that the groove 26d communicates through conduit 25a with conduit 5a (instead of with conduit 4a as does the corresponding groove 6d) and that inversely the groove 26e communicates through conduit 24a with conduit 4a (instead of communicating with conduit 5a as does corresponding groove 6e).

Inasmuch as the two valves are parallelly connected to the control pressure conduit 10a (similar to valve 6a of FIG. 1)—the second valve being connected to line 10a through conduit 10a'—both valves will bypass the transmission fluid at idling speed of the prime mover, independently of a forward or reverse position of the pump. With increasing prime mover speed in forward position of pump 22, valve 6b to 6i will operate in the same manner as valve 6 in FIG. 1, conduit 4 representing the pressure conduit, whereas valve 26b to 26i will immediately interrupt the flow of fluid from conduit 4a to conduit 5a. Inversely, with increasing prime mover speed in reverse position of pump 22, valve 26b to 26i will operate in the same manner as did valve 6b to 6i before, so that conduit 5 will now represent the pressure conduit, whereas valve 6b to 6i will now immediately interrupt the flow of fluid from conduit 5a to conduit 4a.

Also the centrifugal pressure governor is, according to the arrangement of FIG. 2, modified over that of FIG. 1. More specifically, the valve body 12a' forms a sleeve rotatable in bore 7' of the governor housing 28 and is driven in any convenient manner by a prime mover which may also drive the auxiliary pump 11. Sleeve 12a' is provided with bores of different diameters extending in axial direction of said sleeve. Reciprocably mounted in said bores is a valve spool forming a stepped piston 12b'. This piston is reciprocable so that the fluid delivered by auxiliary pump 11 into conduit 9' may flow through annular groove 28a, radial bores 12c' in sleeve 12a', and the annular passage formed by the sleeve and the smaller diameter of stepped piston 12b' to the radial bores 12f' representing a vent. The fluid will in this way act against the differential area defined by the difference of the area of the greater and smaller diameter of piston 12b' in a fluid bypassing sense. The flyweights 14' pivotally journalled on sleeve 12a' will operate by means of their lever-shaped portions and a flange on said piston in a direction counter to the fluid acting upon said differential area while simultaneously throttling the fluid flow more or less. The relief valve 13' may merely by way of example be designed as a ball valve with a ball and a spring 13a'. A conduit 10' leads from groove 28a to a two-way valve designed as a spool valve. In the particular position of the spool valve piston 29a in bore 28e as shown in the drawing, conduit 10' communicates with conduit 10a leading to the bypass valves 26. When shifting lever 29d is moved about its pivot 29e from the position shown in solid lines to the position shown in dot-dash lines, valve spool 29a will be moved toward the right so that conduit 10' will be closed and conduit 10a will communicate with conduit 28c. As a result thereof, the pressure in conduit 10a becomes zero thereby making the coupling of the bypass valve arrangement 26 ineffective.

Referring now to FIG. 3, this figure shows a modified bypass valve, especially for use in connection with a reversible pump 22. The bypass valve construction illustrated therein differs from that of FIG. 2 primarily in that the two bypass valves of FIG. 2 have been replaced by a single valve 36 with a two-step piston 36f. Piston 36f thus has three different diameter sections reciprocably mounted in corresponding bores 36b, 36k and 36c in the valve housing 36a. When pump 22 is in its forward position, conduit 4a in communication with conduit 4 of FIG. 2, represents the pressure conduit, whereas when pump 22 occupies its reverse position, conduit 5a in communication with conduit 5 of FIG. 2, represents the pressure conduit. In this way, the pressure in conduit 4a as well as the pressure in conduit 5a may act upon differential areas of valve piston 36f and may exert forces upon said piston so as to move the same to a fluid bypassing position. It will be understood that said differential areas resulting from the difference in the diameter of the bores 36b and 36k for conduit 4a, and between the diameters of the bores 36k and 36c for conduit 5a.

The bypass valve piston 36f is shown in flow interrupting position in which said piston, by the control pressure in conduit 10a on the left-hand end surface of said piston, is moved toward the right into engagement with the right-hand abutment. This position is occupied by said piston 36f only at relatively high prime mover speeds.

The bypass valve arrangement 46 of FIG. 4 is a modification over the bypass valve of FIG. 3 inasmuch as it represents only a one-step bypass piston 46f instead of the two-step bypass piston 36f of FIG. 3 while being intended for the same use in connection with a reversible pump 22 (FIG. 2). The diameter of the valve spool portion 46f and of the bore 46c at both sides of the transmission fluid passage connecting conduits 4a and 5a is the same, so that the fluid pressure in one or the other conduit 4a or 5a will not be able to act on areas of the valve spool so as to move said spool to a bypass position in which the fluid in groove 46e and conduit 4a communicates with the fluid in groove 46d and in conduit 5a. In order nevertheless to obtain this effect, the left-hand end of spool V2 has a diameter corresponding to bore 46b which latter has a larger diameter than the right-hand bore 46c and spool portion 46f thus forming an annular differential area on valve spool V2. In bore 46b the left-hand end of spool V2 is able to move from the bypassing end position to the fluid flow interrupting end position of spool 46f likewise whereby always an annular conduit is formed by the spool portion 46m and the bore 46b. This annular conduit communicates with conduits 4a and 5a respectively by means of the single ball two-way check valve 46k and conduit 46l as well as by means of the conduits 4b and 5b. Thus, valve 46k is in communication with conduits 4a and 5a through conduits 4b and 5b respectively so that the fluid in the conduit 4 or conduit 5 through conduit 46l communicates with the said annular conduit, depending on whether the reversible pump 22 is set for delivering fluid in one or the other direction and depending on whether the conduit 4 or conduit 5 is representing the pressure conduit. The fluid pressure in said annular conduit exerts an axial force upon the annular piston area under both conditions. This axial force as well as the thrust of spring 46i act upon the bypass valve spool V2 in a bypassing manner precisely in the same way as the pressure upon the differential areas of the above described one or two-step valve spools. These forces are opposed by the force created by the control pressure in conduit 10a acting against the left-hand side surface of valve spool V2 so that the same coupling characteristic will be obtained as with the previous embodiments, and this in the forward as well as in the reverse position of pump 22. This is an advantage inasmuch as a one-step piston can, of course, be more easily manufactured than a two- or double-step piston.

Considering the above, it will be appreciated that, for the same use in connection with a reversible pump 22, the bypass valve 56 of FIG. 5 can be produced at the lowest cost. With the arrangement of FIG. 5, the valve housing 56a is provided with a bore 56b of even diameter for receiving the cylindrical valve spool 56f having cut thereinto the grooves 56d and 56e. The single ball two-way check valve 56k is, similar to the check valve 46k in FIG. 4, in communication with conduits 4a and 5a through conduits 4b and 5b respectively so that each time the liquid of the conduit with a higher pressure therein will communicate with the conduit 56l and through the latter with the chamber 56m between the pressed-in part 56n and closure screw 56c. The pressed-in part 56n is provided with a bore having a piston 56p axially displaceably mounted therein. The fluid pressure in conduit 56l or chamber 56m exerts an axial force upon piston 56p. This axial force as well as the thrust of spring 56i act upon the bypass valve spool 56f in a bypassing sense precisely in the same way as the pressure upon the differential areas of the above-described one- or two-step valve spools. These forces are opposed by the force created by the control pressure in conduit 10a and acting against the left-hand end side surface of valve spool 56f so that the same coupling characteristic will be obtained as with the previous embodiments, and this in the forward as well as in the rearward range of pump 22.

FIG. 6 shows a modification of the centrifugal control pressure producing means. Instead of the pump 11 (see FIG. 1) in connection with a centrifugal pressure governor with metallic flyweights, the arrangement of FIG. 6 employs, for instance, a multi-stage centrifugal auxiliary pump 61, whereby the pump fluid itself is acting as flyweight means. The pump shaft 61b with the pump wheels 61c is rotatably journalled in the pump housing 61a and is driven by the prime mover in any convenient manner. The pump wheels are located in corresponding recesses 61d of the pump housing which recesses represent pressure chambers. From each of these pressure chambers, conduits 61e in the outer wall and the partitions of the pump housing, radial bores 61f lead to annular conduits 61g in the interior of shaft 61b formed by a multi-step pressed-in closure member 61h and from there lead into radial bores 61i of the next pump wheel. The first annular conduit on the left-hand side communicates with the suction conduit 61k through which the fluid is withdrawn from reservoir 17. The last pressure chamber 61d on the right-hand side communicates with conduit 10 leading to a two-way valve 69 designed as a spool valve and also communicates with a relief valve 13". As long as the control pressure with corresponding low prime mover speed is less than the pressure determined by the relief valve 13", the centrifugal pump will produce only a control pressure which is nearly without any flow in conduit 10. As soon as with increasing prime mover speed, the control pressure exceeds the relief valve pressure, the relief valve will be opened, and the fluid flows through the relief valve back to the reservoir 17, the pressure in conduit 10 remaining nearly constant with further increasing prime mover speed.

The two-way valve 69, similar to the above-mentioned described valves, comprises a valve housing 8, a venting bore 8c and a bore 8e having the spool 69a reciprocably mounted therein. The said two-way valve 69 furthermore includes a lever 69d with tilting pivot at 69e and also comprises a spring 69i. When shifting lever 69d into the dot dash-line position, conduit 10 will be closed and conduit 10a will communicate with conduit 8c.

Referring now to FIG. 7, this figure has the control pressure $p_c$ which is produced by the above-mentioned control pressure plotted on the ordinate, whereas the prime mover speed is plotted on the abscissa. As will be seen from the graph, the values for $p_c$ increase parabolically with the prime mover speed and, employing a numerical example, will, at 500 r.p.m. amount to 10 p.s.i., whereas at 1,000 r.p.m., they will amount to 40 p.s.i. For purposes of overcoming the spring thrust, a control pressure $p_c = p_{spring}$ or 15 p.s.i. will be required. The point of intersection of this 15 p.s.i. line with the $p_c$ parabola shows that an engagement of the clutch at $p^* = 0$ will be effected at 600 r.p.m. ($p^*$ indicating the transmission fluid pressure in the measure conduit). In contrast thereto, the engagement of the clutch at $p^* = 500$ p.s.i. will be effected at 800 r.p.m., whereas at $p^* = 1,000$ p.s.i. the engagement will be at 960 r.p.m., and at $p^* = 2,000$ p.s.i. the engaging speed will be at 1,200 r.p.m. The idling speed of the prime mover is 500 r.p.m. $p_c$ increases to 70 p.s.i. at approximately 1,300 r.p.m. and with further increasing prime mover speed, remains constant due to the relief valve 13, 13', 13'', which in this instance limits the control pressure to 70 p.s.i.

Summarizing the effect of the control system as described above, it will be seen that with increasing control pressure, the valve spool will first be moved more and more into a throttling position, i.e., into a position in which, with the pump in running condition, the working fluid will be able only at a more or less high pressure, to flow from the pressure line to the suction line. In this connection, the bypass valve will operate as a throttle in the manner of a slip clutch, so that, even while the hydraulic motor is still at a standstill, higher torques corresponding to the higher pressure in the pressure line may be exerted upon the pump shaft as well as upon the shaft of the hydraulic motor without, however, the input power being conveyed from the pump to the motor. Only with further increasing control pressure is the valve spool eventually moved into a position in which the flow of the fluid from the pressure conduit to the suction conduit is completely interrupted so that a slip-free hydraulic coupling condition will exist between the pump and the motor. The control pressure required for this purpose is illustrated by the parabola-shaped curve of FIG. 7. As will be seen therefrom, for the required control pressure $p_c$, the following equation has to be met.

$$(a) \quad p_c > \frac{S}{A_p \text{contr.}} + \frac{p^* \odot A_{p^*}}{A_p \text{contr.}}$$

In this equation $p_c$ = control pressure.
$S$ = spring force.
$A_p$ contr. = area through the intervention of which the control pressure acts upon the valve spool.
$p^*$ = the pressure in pressure conduit.
$A_{p^*}$ = area through the intervention of which $p^*$ acts upon the valve spool.

The term $$\frac{S}{A_p \text{ contr.}}$$

may be written as $p_{spring}$ and the term $$\frac{p^* \odot A_{p^*}}{A_p \text{ contr.}}$$

may be written as $p_{p^*}$ which is the portion of the control pressure caused by $p^*$.

The above Equation $a$ would then read $$(b) \quad p_c = p_{spring} + p_{p^*}$$

With reference to the specific curve of FIG. 7, this would mean that the required control pressure $p_c$ at 960 r.p.m. engaging speed equals $p_{spring} = 15$ p.s.i. $+ p_{p^*} = 23$ p.s.i. (control pressure when the pressure in pressure line is 1000 p.s.i.).

Thus, $p_c$ at 960 r.p.m. = 38 p.s.i.

The pressure $p^*$ is, on the other hand, proportional to the torque exerted by the prime mover upon the hydraulic pump and is thus a function of the accelerator position of the prime mover. The control pressure required for a slip-free coupling of pump and motor will, therefore, have to be higher the wider the gas throttle is opened. On the other hand, the control pressure is, in conformity with the present invention, controlled by centrifugal means driven by the prime mover, in such a way that the control pressure will first increase with the speed of the prime mover so that, as will be evident from the above, a slip-free coupling with wider-open gas throttle will be possible only at correspondingly higher prime mover speed.

These conditions will best become apparent from FIG. 8 showing the coupling characteristic of a bypass valve according to the invention in connection with a certain numerical example as it may prevail at the starting of a vehicle. Plotted on the ordinate is the prime mover speed whereas $p^*$ representing the pressure in pressure conduit is plotted on the abscissa. The curve shown in FIG. 8 represents the borderline between engagement with the slip and slip-free engagement in correspondance with $p^*$, which means in correspondance with the torque or throttle position of the prime mover.

With specific reference to FIG. 8, it will be seen that at idling speed of 500 r.p.m., the pump and motor of the transmission are fully disengaged, which means that the pump is short-circuited. Pushing down the throttle slightly so as to obtain a speed of 600 r.p.m., there will be approached the range of engagement with slip. Pushing down the throttle still further so that, e.g. a $p^*$ of 500 p.s.i. will be obtained, a prime mover speed of approximately 800 r.p.m. will be obtained, whereas with the throttle opened further, e.g. corresponding to $p^* = 2,000$ p.s.i., a prime mover speed of about 1,200 r.p.m. will result. This takes place while the vehicle is still at a standstill and while a torque is already exerted upon the pump input shaft. This prevents the prime mover from racing while the entire delivery of the pump at the thus limited prime mover and pump speeds, is bypassed under the said high $p^*$. At the same time, this pressure exerts a torque through the motor upon the output shaft to accelerate the vehicle out of its standstill position. With increasing speed of the vehicle, the motor speed increases also more and more and the motor absorbs more, and more of the pump delivery, so that less and less fluid will be bypassed until at certain vehicle speed, or motor speed, the motor absorbs all of the pump delivery, and the bypass valve closes so that now pump and motor are engaged in a slip-free manner. When the vehicle speed increases still further, the pump and motor speed will likewise increase.

From the above, it will be evident that when starting the vehicle, i.e., at a standstill of the hydrostatic motor, the prime mover will at full throttle position obtain a considerably higher speed than the speed at only slightly opened throttle. This is highly important because at full torque, the prime mover cannot rotate below a speed amounting to approximately 40% of its maximum speed, at which it normally also furnishes its maximum torque.

It may be noted that for hydraulically producing the control forces in connection with differential areas, only low control pressures are required, so that weight and costs for such devices can at any rate be maintained at a minimum.

It is, of course, to be understood that the present invention is, by no means, limited to the particular constructions shown in the drawings, but also comprises any modifications within the scope of the appended claims.

What I claim is:

1. In a control arrangement for a hydrostatic transmission having an input shaft adapted to be driven at variable speed and also having an output shaft: a fluid pump drivingly connected to said input shaft so as to be drivable thereby, a fluid motor drivingly connected to said output shaft for driving the same, pressure and return conduits connecting said pump with said motor for the exchange of fluid therebetween for driving said motor while said pump is delivering fluid, a bypass valve arranged in parallel to said conduits and comprising a valve member movable into a first position for establishing a bypass between said conduits to permit fluid in said conduits to bypass said motor, said valve member also being movable into a second position for interrupting said bypass, said valve member also being movable into positions intermediate said first and second positions for throttling said bypass, spring means urging said valve member toward said first position, said valve member having operatively associated therewith a first fluid operable area for communication with said pressure conduit which area when subjected to fluid pressure in said pressure conduit acts upon said valve member in the same direction as said spring means, said valve member also having operatively associated therewith a second fluid operable area adapted to be subjected to fluid pressure for acting upon said valve member in a direction opposite to the direciton of action of said first fluid operable area, a source of control fluid pressure for conveying fluid pressure to said second fluid operable area, and speed responsive means drivingly connected to said input shaft for varying the pressure of said source of control fluid pressure with the varying speed of said input shaft.

2. A control arrangement according to claim 1, in which said first and second fluid operable areas are formed directly on said valve member.

3. In a control arrangement for a hydrostatic transmission having an input shaft adapted to be driven at variable speed and also having an output shaft: a fluid pump drivingly connected to said input shaft so as to be drivable thereby, a fluid motor drivingly connected to said output shaft for driving the same, pressure and return conduits connecting said pump with said motor for the exchange of fluid therebetween for driving said motor while said pump is delivering fluid, a bypass valve arranged in parallel to said conduits and comprising a valve member movable into a first position for establishing a bypass between said conduits to permit fluid in said conduits to bypass said motor, said valve member also being movable into a second position for interrupting said bypass, said valve member also being movable into positions intermediate said first and second positions for throttling said bypass, spring means urging said valve member toward said first position, said valve member having operatively associated therewith a first fluid operable area for communication with said pressure conduit which area when subjected to fluid pressure in said pressure conduit acts upon said valve member in the same direction as said spring means, said valve member also having operatively associated therewith a second fluid operable area adapted to be subjected to fluid pressure for acting upon said valve member in a direction opposite to the direction of action of said first fluid operable area, a source of control fluid pressure for conveying fluid pressure to said second fluid operable area, speed responsive means drivingly connected to said input shaft for varying the pressure of said source of control fluid pressure with the varying speed of said input shaft, and means selectively operable for interrupting communication between said second fluid operable area and said source of control fluid pressure and for establishing communication of said second fluid operable area with an exhaust to promote selective movement of said valve member into said first position to establish said bypass independently of the speed of said input shaft.

4. In a control arrangement for a hydrostatic transmission having an input shaft adapted to be driven at variable speed and also having an output shaft: a fluid pump drivingly connected to said input shaft so as to be drivable thereby, a fluid motor drivingly connected to said output shaft for driving the same, a pressure conduit and a return conduit, said conduits connecting said pump with said motor for the exchange of fluid therebetween for driving said motor while said pump is delivering fluid, a bypass valve arranged in parallel to said conduits and comprising a valve housing having a stepped bore with a larger diameter portion and a smaller diameter portion, a valve member being stepped to fit said bore and being movable in said bore into a first position for establishing a bypass between said conduits to permit fluid in said conduits to bypass said motor, said valve member also being movable into a second position for interrupting said bypass, said valve member also being movable into positions intermediate said first and second positions for throttling said bypass, said pressure conduit communicating with said larger diameter portion of said bore in said housing, said return conduit communicating with said larger diameter portion of said bore in said housing and being spaced from the point of communication of said pressure conduit with said larger diameter portion of said bore, spring means urging said valve member toward said first position, said valve member having operatively associated therewith a first fluid operable area for communication with said pressure conduit which area when subjected to fluid pressure in said pressure conduit acts upon said valve member in the same direction as said spring means, said valve member also having operatively associated therewith a second fluid operable area adapted to be subjected to fluid pressure for acting upon said valve member in a direction opposite to the direction of action of said first fluid operable area, a source of control fluid pressure for conveying fluid pressure to said second fluid operable area, and speed responsive means dirivingly connected to said input shaft for varying the pressure of said source of control fluid pressure with the varying speed of said input shaft.

5. In a control arrangement for a hydrostatic transmission having an input shaft adapted to be driven at variable speed and also having an output shaft: a fluid pump drivingly connected to said input shaft so as to be drivable thereby, a fluid motor drivingly connected to said output shaft for driving the same, a pressure conduit and a return conduit, said conduits connecting said pump with said motor for the exchange of fluid therebetween for driving said motor while said pump is delivering fluid, a bypass valve arranged in parallel to said conduits and comprising a valve housing with a bore therein, said pressure and return conduits communicating with said bore of said housing at spaced points along said bore, said bypass valve also comprising a valve member movable into a first position for establishing a bypass between said conduits to permit fluid in said conduits to bypass said motor, spring means urging said valve member toward said first position, said valve member also being movable into a second position for interrupting said bypass and also being movable into positions intermediate said first and second positions for throttling said bypass, said valve member having a reduced diameter portion for establishing communication between said two points when said valve member is in said first position, said valve member having formed thereon a piston portion with a first fluid operable area thereon spaced from said reduced diameter portion which area when subjected to fluid pressure acts upon said valve member in the same direction as said spring means, said bore in said housing including a bore portion for receiving said piston portion, said pressure conduit communicating with said first fluid operable area, said piston portion also having a second fluid operable area adapted to be subjected to fluid pressure for acting upon said valve member in a direction opposite to the direction of action of said first fluid operable area when the latter is subjected to fluid pressure, a source of control pressure for conveying fluid pressure to said second fluid area, and speed responsive means dirivingly connected to said input shaft for varying the pressure of said source of control pressure with the varying speed of said input shaft.

6. In a control arrangement for a hydrostatic transmission having an input shaft adapted to be driven at variable speed and also having an output shaft: a reversible fluid pump drivingly connected to said input shaft so as to be drivable thereby, a fluid motor drivingly connected to said output shaft for driving the same, pressure and return conduits connecting said pump with said motor for the exchange of fluid therebetween for driving said motor while said pump is delivering fluid, a bypass valve in- including a housing with a bore having a smaller diameter portion and a larger diameter portion and also including a valve member having a smaller diameter portion and a larger diameter portion respectively reciprocable in said smaller diameter portion and said larger diameter portion of said bore, first and second conduit means respectively communicating with said pressure and return conduits and leading into the smaller diameter portion of said bore at axially spaced points thereof, said valve member having a reduced diameter section in said smaller diameter portion thereof and being movable into a first position for establishing communication between said first and second conduit means by means of said reduced diameter section to thereby permit fluid in said pressure and return conduits to bypass said motor, said valve member also being movable into a second position for interrupting said communication and thereby said bypass, said valve member also being movable into positions intermediate said first and second positions for throttling said communication between said first and second conduit means, spring means urging said valve member toward said first position, said larger diameter portion of said valve member having a first pressure fluid operable area operable when subjected to fluid pressure to act upon said valve member in the same direction as said spring means, said larger diameter portion of said valve member also having a second pressure fluid operable area operable when subjected to fluid pressure to act upon said valve member in a direction opposite to the direction of action of said first pressure fluid operable area, additional conduit means communicating with said pressure conduit and with said first pressure fluid operable area, a source of control fluid pressure for conveying fluid pressure to said second pressure fluid operable area, and speed responsive means drivingly connected to said input shaft for varying the pressure of said source of control fluid pressure with the varying speed of said input shaft.

7. In a control arrangement for a hydrostatic transmission having an input shaft adapted to be driven at variable speed and also having an output shaft: a reversible fluid pump drivingly connected to said input shaft so as to be drivable thereby, a fluid motor drivingly connected to said output shaft for driving the same, two main conduits connecting said pump with said motor for the exchange of fluid therebetween for driving said motor while said pump is delivering fluid, each of said main conduits being operable to serve as delivery conduit and as return conduit depending on whether said reversible pump is set for delivering in one direction or the other direction, a bypass valve including a housing with a bore having a smaller diameter portion and a large diameter portion and also including a valve member having a smaller diameter portion and a larger diameter portion respectively reciprocable in said smaller diameter portion and said larger diameter portion of said bore, first and second conduit means respectively communicating with said two main conduits and leading into the smaller diameter portion of said bore at axially spaced points thereof, said valve member having a reduced diameter section in said smaller diameter portion thereof and being movable into a first position for establishing communication between said first and second conduit means by means of said reduced diameter section to thereby permit fluid in said main conduits to bypass said motor, said valve member also being movable into a second position for interrupting said communication and thereby said bypass, said valve member also being movable into a position intermediate said first and second positions for throttling said communication between said first and second conduit means, spring means urging said valve member toward said first position, said larger diameter portion of said valve member having a first pressure fluid operable area operable when subjected to fluid pressure to act upon said valve member in the same direction as said spring means, said larger diameter portion of said valve member also having a second pressure fluid operable area operable when subjected to fluid pressure to act upon said valve member in a direction opposite to the direction of action of said first pressure fluid operable area, a two way check valve having conduit means establishing communication between said first pressure fluid operable area of said larger diameter portion of said valve member and that one of the said first conduit means, or the said second conduit means in which prevails the higher pressure, a source of control fluid pressure for conveying fluid pressure to said second fluid pressure operable area, and speed responsive means drivingly connected to said input shaft for varying the pressure of said source of control pressure with the varying speed of said input shaft.

8. In a control arrangement for a hydrostatic transmission having an input shaft adapted to be driven at variable speed and also having an output shaft: a reversible fluid pump drivingly connected to said input shaft so as to be drivable thereby, a fluid motor drivingly connected to said output shaft for driving the same, two main conduits connecting said pump with said motor for the exchange of fluid therebetween for driving said motor while said pump is delivering fluid, each of said main conduits being operable to serve as delivery conduit and as return conduit depending on whether said reversible pump is set for delivering in one direction or the other direction, a bypass valve including a housing with a bore, said bypass valve also comprising a valve member reciprocable in said bore and having a first section and a second section of substantially the same diameter separated from each other by a reduced diameter section, first and second conduit means respectively communicating with said two main conduits and leading into said bore at axially spaced points thereof, said valve member being movable into a first position for establishing communication between said first and second conduit means by means of said reduced diameter section to thereby permit fluid in said main conduits to bypass said motor, said valve member also being movable into a second position for interrupting said communication and thereby said bypass, said valve member also being movable into positions intermediate said first and second positions for throttling said communication between said first and second conduit means, spring means acting upon said valve member to thereby urge said valve member toward said first position, said second section of said valve member having a fluid pressure operable area operable when subjected to fluid pressure to act upon said valve member in a direction opposite to the direction of action of said spring means, said housing comprising a chamber separated from said bore, plunger means extending into said chamber and operable when subjected to fluid pressure in said chamber to act upon said valve member in the same direction of action as said spring means, a two way check valve having conduit means establishing communication between said chamber, and that one of the said first conduit means or the said second conduit means in which prevails the higher pressure, a source of control fluid pressure for conveying fluid pressure to said fluid pressure operable area of said second valve member section, and speed responsive means drivingly connected to said input shaft for varying the pressure of said source of control pressure with the varying speed of said input shaft.

9. A control arrangement for a hydrostatic transmission, which comprises: a variable speed input shaft, a fluid pump drivingly connected to said input shaft so as to be drivable thereby, a fluid motor, an output shaft drivingly connected to said motor, fluid delivery and return conduits interconnecting said pump and motor, bypass valve means arranged in parallel to said conduits, valve member means reciprocable in said bypass valve means and movable into a first position for short-circuiting said delivery and return conduits to cause fluid in said conduits to bypass said motor, said valve member means also being movable into a second position for interrupting said bypass and furthermore being movable into intermediate positions for throttling said bypass, spring bias means urging said valve member means toward said first position, first fluid operable means operatively connected to said valve member means and communicating with that one of said conduits in which prevails the higher fluid pressure and operable in response to said higher fluid pressure acting upon said valve member means in the same direction as said spring bias means, second fluid operable means operatively connected to said valve member means and operable when subjected to fluid pressure to act upon said valve member means in a direction opposite to the direction of action of said spring bias means, and control pressure delivery means operatively connected to said input shaft for varying and conveying fluid pressure to said second fluid operable means.

10. A control arrangement according to claim 9, in which said fluid pump is a reversible pump, and in which said bypass valve means comprise two separate valve bores respectively having separate valve members reciprocably mounted therein, conduit means being provided for establishing fluid connection of the fluid operable means of said separate valve members with said delivery and return conduits, the said fluid connections between said delivery and return conduits and the fluid operable means of said valve members being respectively reversed for said separate valve members.

11. A control arrangement according to claim 1, in which said source of control fluid pressure includes an auxiliary pump having a suction side and a pressure side and also includes a fluid reservoir communicating with the said suction side of said auxiliary pump, and in which said speed responsive means includes governor means operatively connected to said input shaft and also includes a valve having a bore with an inlet communicating with the pressure side of said auxiliary pump and an outlet communicating with said reservoir, said last mentioned valve also comprising a valve member operatively connected to said governor means and below a certain speed of said input shaft occupying an open position for establishing free communication between said inlet and said outlet of said last mentioned valve bore and from said certain speed upwards being movable toward a closed position to restrict the flow of fluid from said inlet through said bore to said outlet to thereby cause said control pressure to increase as the input shaft speeds up.

12. A control arrangement according to claim 11, which includes pressure relief valve means interposed between the pressure side of said auxiliary pump and said fluid reservoir.

13. A control arrangement according to claim 1, in which a multi-stage centrifugal pump forms said source of control pressure and said speed responsive means.

14. A control engagement according to claim 5, in which the bore of said bypass valve has three sections of different diameters with the diameters of said three sections increasing stepwise in succession from one end of said bore towards the other end thereof, and in which said valve member has three different diameter sections respectively corresponding to the diameters of said bore, the valve member section of the smallest diameter being spaced from the adjacent greater diameter section of said valve member by an annular groove, said spring means acting upon that area of said smallest diameter section of said valve member which is remote from said annular groove.

15. In a control arrangement for a hydrostatic transmission having an input shaft adapted to be driven at variable speed and also having an output shaft: a fluid pump drivingly connected to said input shaft so as to be drivable thereby, a fluid motor drivingly connected to said output shaft for driving the same, two main conduits connecting said pump with said motor for the exchange of fluid therebetween for driving said motor while said pump is delivering fluid, and means for by-passing fluid between said conduits comprising valve means having body means, said body means having shouldered bore means therein and part means in the body means connecting with the bore means at the shoulders therein and connected to the respective said conduits, valve member means slidably fitting in said bore means having shoulder means thereon opposed to the shoulders in the bore means and responsive to fluid pressure supplied to said bore means via said part means for urging the valve member means in one direction toward a first end position wherein said part means are interconnected, spring means also urging said valve member means in said one direction, fluid operable area means on the valve member means opposed to said spring means and responsive to fluid pressure for moving said valve member means in a direction away from said first end position toward a second end position opposite to said one direction wherein communication between said part means is interrupted, a source of control fluid pressure connected to said fluid operable area means, and speed responsive means connected to the input shaft operable for varying the pressure of said source of control fluid pressure with varying speed of said input shaft, said valve member means having a position intermediate said end positions wherein the communication between said part means is restricted for throttling the flow of fluid between said conduits.

16. In a control arrangement for a hydrostatic transmission having an input shaft adapted to be driven at variable speed and also having an output shaft; a fluid pump drivingly connected to said input shaft so as to be drivable thereby, a fluid motor drivingly connected to said output shaft for driving the same, two main conduits connecting said pump with said motor for the exchange of fluid therebetween for driving said motor while said pump is delivering fluid, and means for by-passing fluid between said conduits comprising valve means having body means, said body means having spaced part means therein connected to said conduits, valve member means reciprocable in said body means between a first end position wherein said part means are interconnected to permit fluid to by-pass between said conduits and a second end position wherein communication between said part means is interrupted to interrupt the by-passing of fluid between said conduits, first fluid operable area means on said valve member means responsive to fluid pressure for urging said valve member means toward said first end position and connected to said conduits to receive pressure therefrom, spring means also urging said valve member means toward said one end position, second fluid operable area means on said valve member means responsive to fluid pressure for urging said valve member means toward said second end position, a source of control fluid pressure connected to said second fluid operable area means, and means drivingly connected to said input shaft operable for varying the pressure of said control fluid pressure with varying speed of said input shaft, said valve member means having a position intermediate said end positions wherein the communication between said part means is restricted for throttling the flow of fluid between said conduits.

17. A control arrangement according to claim 16 wherein said valve member means comprises two valve members, said first fluid operable area means comprising a first fluid operable area on each valve member, and each of said first fluid operable areas being connected to a different one of said conduits, said part means including a pair of parts under the control of each valve member.

18. A control arrangement according to claim 16 wherein said valve member means comprises a single valve member, and said first fluid operable area means comprising a pair of fluid operable areas on said valve member each connected to a different one of said conduits.

References Cited in the file of this patent

UNITED STATES PATENTS

| | | |
|---|---|---|
| 2,155,247 | Warner | Apr. 18, 1939 |
| 2,603,065 | Sarto | July 15, 1952 |
| 2,874,533 | Schott | Feb. 24, 1959 |
| 2,972,224 | Forster | Feb. 21, 1961 |
| 3,069,856 | Uher | Dec. 25, 1962 |